July 5, 1927.
C. D. THOMPSON
1,634,600
DEVICE FOR EXTRACTING BUSHINGS AND THE LIKE
Filed Feb. 6, 1926   2 Sheets-Sheet 2
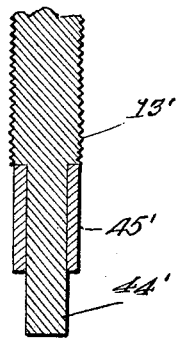
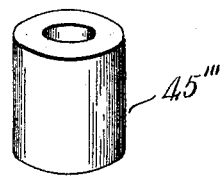
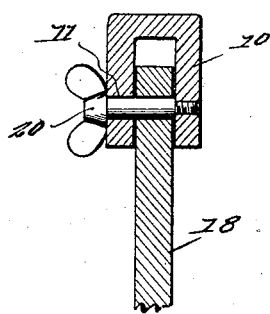
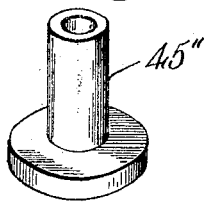
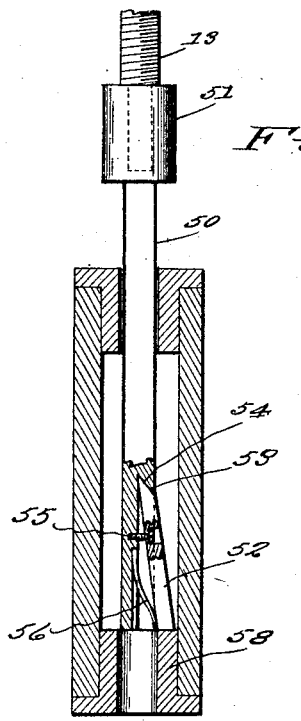
INVENTOR
C. D. Thompson
BY Victor J. Evans
ATTORNEY
R. A. Thomas
WITNESS Patented July 5, 1927.

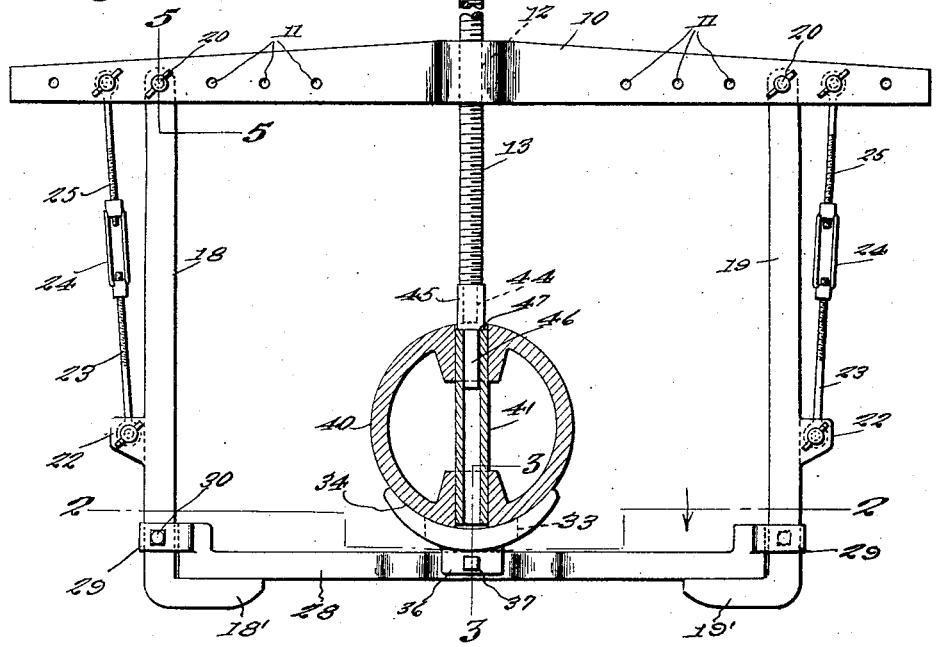

1,634,600

UNITED STATES PATENT OFFICE.

CHARLES D. THOMPSON, OF ROANOKE, VIRGINIA.

DEVICE FOR EXTRACTING BUSHINGS AND THE LIKE.

Application filed February 6, 1926. Serial No. 86,561.

The object of this invention is to provide means especially adapted for extracting a bushing from a bore, for removing a wrist-pin from a piston, for pulling a wheel from a shaft on which it is mounted, and for performing other similar operations.

A further object is to provide for retaining the article from which the bushing or orther element is to be extracted, and to provide a threaded element adapted to carry an end piece suitable for effecting the particular result desired.

With the foregoing and other objects in view, the invention consists in the novel construction and arrangement of elements described, illustrated, and claimed, it being understood that modifications may be made within the scope of the claims, without departing from the spirit of the invention.

In the drawings forming part of this application,

Fig. 1 shows the device in elevation;

Fig. 2 is a section on line 2—2 of Fig. 1;

Fig. 3 is a section on line 3—3 of Fig. 1, but not showing the piston and wrist-pin;

Fig. 4 is a vertical section thru the end portion of the principal threaded element, a sleave being applied to the lower reduced portion of said element;

Fig. 5 is a section on line 5—5 of Fig. 1;

Fig. 6 is a perspective view of an element to be applied to the end of the principal screw, this element including a s'eeve or the like carring a disk member, so that the tool may be employed for clamping or bending purposes;

Fig. 7 is a perspective view of a cylindrical element having a central bore and heavy wall, and designed, when suitably mounted, to provide a relatively heavy device for use in particular operations; and Fig. 8 is a view chiefly in vertical section showing an element applied to the end of the threaded member and having a lower split portion including a resiliently mounted finger or engaging device for contact with a bushing or the like to be removed from the element in which it was originally mounted.

The bar 10 constitutes a channel element, having the cross-section shown in Fig. 5, and the end portions each being provided with a series of apertures, these apertures being shown by way of illustration at 11. The bar 10 is also provided with an internally threaded bore at 12, and a principal screw 13 passes thru the bore and engages the threads thereof.

Screw 13 is controlled by means of a lever 14 passing freely thru a transverse bore in the head 15 formed on or carried by the screw 13.

The bar or leaver 14 is provided with a permanently mounted head 16 at one end, and with a detachable head 17 at the opposite end; and it will be understood that the leverage exerted by bar 14 may be varied, by sliding the bar thru head 15, so that one end will be longer than the other end.

Arms 18 and 19 are provided respectively with hook portions 18' and 19', the hook portions extending toward each other, and the upper ends of arms 18 and 19 project between the sides of the channel element 10, and are secured by thumb-bolts or the like passing thru apertures 11, and having threaded engagement with bar 10. The thumb-bolts are designated 20, and they may be shifted as desired, along the bar with which the are connected.

Ears, such as 22, project from the outer sides of arms 18 and 19, and tie rods 23 are connected with the ears, and also connected with turnbuckles 24, the latter having connection by means of tie rods 25 with bar 10. The connections for the tie rods may also be effected by means of thumb bolts.

The bar 28, shown in Fig. 2, includes spaced ears 29 forming forked ends adapted to straddle the bars 18 and 19 and to be connected therewith by means clamping screws or bolts 30. The bar 28 is therefore slidable vertically with reference to arms 18 and 19, and is provided with an enlarged central portion 31 having an opening 32 therein thru which an element being removed from a bore in another device may drop and be discharged when loosened from its seat.

In the section of Fig. 3, I have shown as applied to the middle portion of bar 28, a saddle member or the like designated 33, and curved as shown at 34 for engagement with a cylindrical object, such as a piston from which it may be desired to extract a wrist-pin. Connected with element 33 and extending downwardly therefrom are ears 36, adapted for connection with the enlarged portion 31, by means of set-screws or the like shown at 37.

In Fig. 1, I have shown by way of illustration, a piston 40 from which a wrist-pin 41 is to be extracted. In this instance, screw 13 has applied thereto, and especially to the reduced end 44 thereof, an element 45 having a central bore and having the reduced end portion 46; so that a shoulder is provided at 47 for engagement with the upper end of the wrist-pin. In Fig. 4 the reduced end 44' of element 13' passes thru a sleeve 45', and the device acts as in Fig. 1. The devices of Figs. 6 and 7 may be used in other types of operations, these sleeves being marked 45'' and 45''', respectively, in these views, and the device shown in Fig. 8, includes a lower split portion for engagement with a bushing from the inner end thereof, and in the manner illustrated.

In this view (Fig. 8) the spindle 50 carries a head 51 having a central bore for engagement with the reduced end of the screw 13. A finger 52 has a beveled end 53 engaging the undercut wall 54, and a screw 55 limits the movement of the finger, which is thrown outwardly by spring 56 mounted as illustrated, the lower end of the finger engaging the bushing 58 in the manner shown, which bushing may then be forced out in an obvious manner.

Having thus described the invention, what is claimed as new is:—

1. In a device of the class described, a main bar, a screw threaded therethru, means for mounting the work, and a tool to be carried by the lower end of the screw, said tool including a spindle having a lower cutaway portion and having an undercut shoulder adjacent to the cutaway portion, a resiliently mounted finger extending from the lower end of the spindle into the undercut portion, and adjustable means for limiting the movement of the finger.

2. In a device of the class described, a screw, mounting means therefor, work-mounting means toward which the screw is to be advanced, a tool carried by the end of the screw, said work-mounting means including a transverse bar having a central opening, and a detachable saddle element having a central opening registering with the opening first named, the saddle having a concave work-engaging surface and including downwardly extending spaced devices projecting on opposite sides of the transverse element and adjustably connected therewith.

3. In a device of the class described, an inverted channel bar having a central portion with an opening therein, a screw threaded thru the opening, spaced arms adapted to extend at an angle with the channel bar and having their ends projecting thereinto, means for connecting these ends with the channel bar in various positions with reference to the screw, longitudinally extensible means for bracing the spaced arms, these arms having lateral extensions projecting toward each other, a transverse bar adapted to engage these extensions and slidable with reference to the spaced arms, a saddle carried by the transverse bar, said bar last named and saddle havings openings therethru in registration, and a tool carried by the screw in alinement with the registering openings.

In testimony whereof I affix my signature.

CHARLES D. THOMPSON.